United States Patent
Johnson et al.

(10) Patent No.: US 11,921,935 B1
(45) Date of Patent: Mar. 5, 2024

(54) GESTURE-BASED WEARABLE DEVICE HAVING CODED COMMANDS

(71) Applicant: Toshiba Global Commerce Solutions, Inc., Durham, NC (US)

(72) Inventors: Brad M. Johnson, Raleigh, NC (US); Daniel Paul Kelaher, Fuquay-Varina, NC (US)

(73) Assignee: TOSHIBA GLOBAL COMMERCE SOLUTIONS, Durham, NC (US)

( * ) Notice: Subject to any disclaimer, the term of this patent is extended or adjusted under 35 U.S.C. 154(b) by 0 days.

(21) Appl. No.: 18/108,723

(22) Filed: Feb. 13, 2023

(51) Int. Cl.
 *G06F 3/048* (2013.01)
 *G06F 3/01* (2006.01)
 *G06K 7/14* (2006.01)
 *G06K 19/077* (2006.01)

(52) U.S. Cl.
 CPC .............. *G06F 3/017* (2013.01); *G06F 3/014* (2013.01); *G06K 7/1417* (2013.01); *G06K 19/07762* (2013.01)

(58) Field of Classification Search
 CPC ............ G06K 7/1417; G06K 19/07762; G06F 3/017; G06F 3/014
 See application file for complete search history.

(56) References Cited

U.S. PATENT DOCUMENTS

| | | | | |
|---|---|---|---|---|
| 6,128,004 A | * | 10/2000 | McDowall | G06F 3/014 345/158 |
| 9,104,271 B1 | * | 8/2015 | Adams | G06F 3/0233 |
| 9,895,106 B1 | * | 2/2018 | Graybill | G06F 3/014 |
| 2015/0379549 A1 | * | 12/2015 | Hwang | G09C 1/00 705/14.27 |
| 2016/0180594 A1 | * | 6/2016 | Todeschini | G06F 3/017 345/633 |
| 2017/0086712 A1 | * | 3/2017 | Mauro | A61B 5/7221 |
| 2017/0319950 A1 | * | 11/2017 | Buchanan, IV | A63F 13/21 |
| 2019/0101981 A1 | * | 4/2019 | Elias | A41D 19/00 |
| 2019/0188433 A1 | * | 6/2019 | Todescato | G06K 7/1091 |
| 2020/0022433 A1 | * | 1/2020 | Lu | A41D 19/0037 |
| 2021/0081042 A1 | * | 3/2021 | Baier | G06F 3/017 |

FOREIGN PATENT DOCUMENTS

| | | | | |
|---|---|---|---|---|
| CN | 107340858 A | * | 11/2017 | ............. G06F 3/013 |
| JP | 2008225913 A | * | 9/2008 | ............. G06Q 10/06 |
| KR | 20180095184 A | * | 3/2019 | |

OTHER PUBLICATIONS

Unknown, VR & Haptic Technology Gloves, SenseGlove (available at https://www.senseglove.com/).

\* cited by examiner

*Primary Examiner* — Rashawn N Tillery
(74) *Attorney, Agent, or Firm* — Kaufman & Canoles, P.C.

(57) ABSTRACT

A method is performed by a garment configured to be worn when servicing a system. The garment has a machine-readable code positioned on the garment. The machine-readable code is associated with a command. The method includes positioning the machine-readable code for reading by a sensing device operable to recognize the machine-readable code and send a signal indicative of the command associated with the machine-readable code to a processor operable to implement the command.

18 Claims, 6 Drawing Sheets

GESTURE-BASED WEARABLE DEVICE HAVING CODED COMMANDS

BACKGROUND

Service technicians troubleshooting and/or repairing complex electronics or electro-mechanical systems frequently utilize diagnostics tutorials and/or repair tutorials as part of their "tool kit" during the course of a service call. Given that service calls/repairs are ideally implemented as quickly and efficiently as possible, access and use of diagnostic tutorials and repair tutorials needs to be efficient in order to reduce the length of a service call.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

Figure 1:
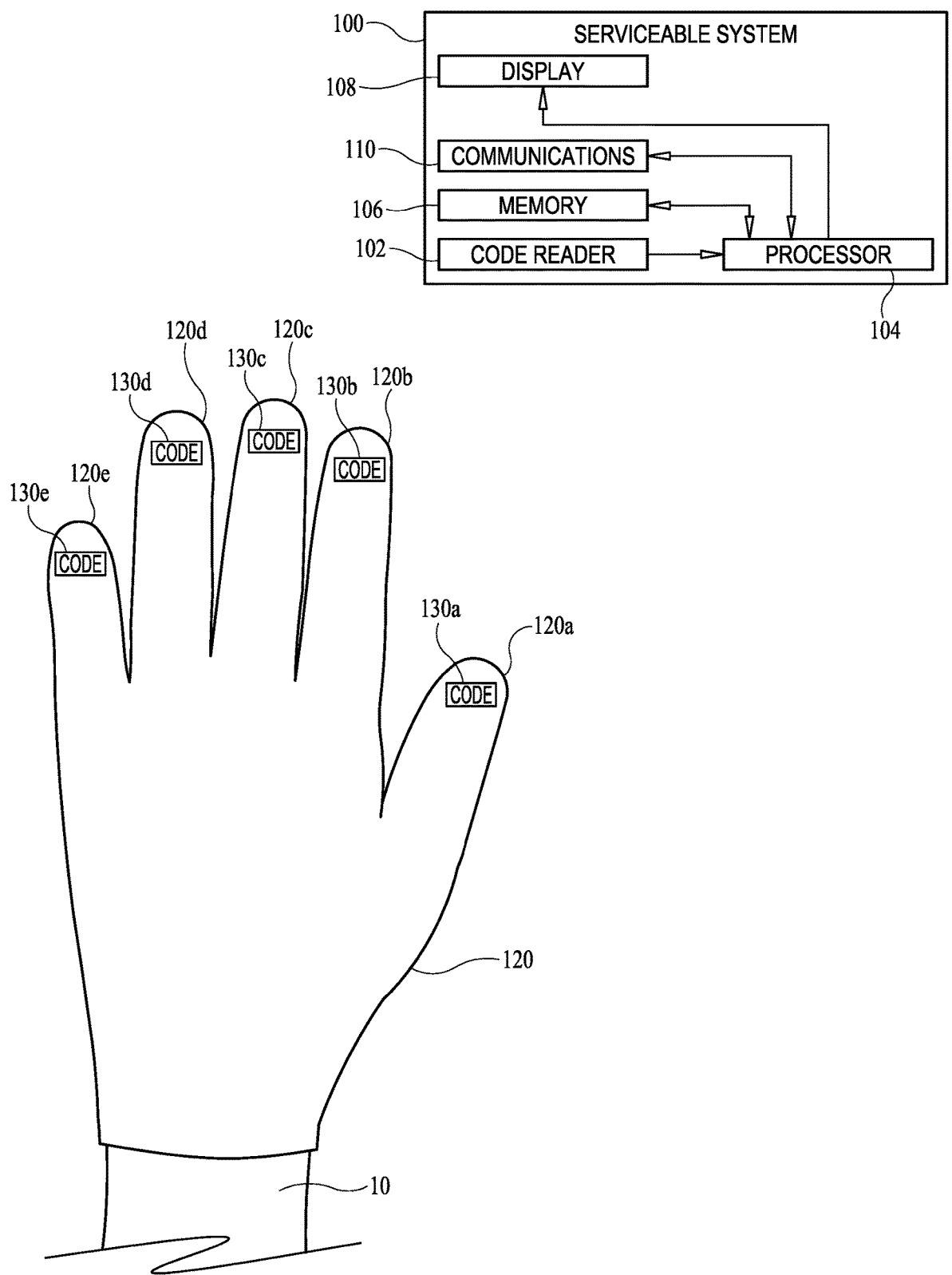
FIG. 1 illustrates one embodiment of a gesture-based wearable device having coded commands in accordance with various aspects as described herein.

For simplicity and illustrative purposes, the present disclosure is described by referring mainly to exemplary embodiments thereof. In the following description, numerous specific details are set forth in order to provide a thorough understanding of the present disclosure. However, it will be readily apparent to one of ordinary skill in the art that the present disclosure may be practiced without limitation to these specific details.

Service technicians are called upon to diagnose and repair complex electronic or electro-mechanical systems quickly, efficiently, and effectively. As part of this process, a technician frequently needs to consult with manuals and/or tutorials that explain diagnostics and repair processes for the system being serviced. Increasingly, these manuals and/or tutorials are available electronically, e.g., stored on a device, accessible via a local intranet, accessible via a global internet, etc. While a technician can access these manuals/tutorials on a smartphone or tablet, controlling the smartphone/tablet requires the use of one or both of the technician's hands which simultaneously need to be engaged with the system being serviced. Accordingly, there is a need for improved methods and systems for a service technician to access information needed during the troubleshooting and repair of a serviceable system.

In this disclosure, methods and systems are provided for service technicians to use when troubleshooting and repairing serviceable systems. In one exemplary embodiment, the device includes a garment (e.g., glove) configured to be worn by a user (e.g., a technician's hand). One or more machine-readable codes (e.g., QR codes) are positioned on the garment such as on one or more fingers of a glove. Each code has a command associated therewith that will enable access and/or control of some type of functional means, unit, or module. One of the benefits of the device is that the user can utilize the code(s) to quickly access information about the system being serviced. Since many of today's serviceable systems (e.g., point-of-sale terminals, self-checkout systems, appliances, and a variety of "internet of things" systems, etc.) incorporate smart cameras, processors, memory, communications, and displays, the present disclosure enables the user to leverage the serviceable system itself to improve the diagnostic and repair process of the serviceable system. For instance, a user wearing the garment having a code disposed thereon can direct the portion of the garment having the code towards the viewing angle of a camera of the system under service. The camera can capture an image that includes that code and the processor can obtain a code value from the code displayed on the image. The processor can then perform a certain function specific to the code value. In one example, the code value corresponds to a hypertext markup language (HTML) address associated with the system under service. In another example, the code value corresponds to a password that authorizes access to secured data of the system. In yet another example, the code value corresponds to a diagnostic application executed by the system.

In one example of the present disclosure, FIG. 1 illustrates an existing serviceable system 100 such as one of those mentioned above. Relevant to the present disclosure, serviceable system 100 may include a code reader 102 (e.g., a code sensing device such as an optical reader, smart camera, etc.), a processor 104, memory 106, and a display 108. In some embodiments, serviceable system 100 may include communications 110 operable by the processor 104 to access a local intranet and/or a global internet. The communication functions of the communications 110 may include data communication, voice communication, multimedia communication, short-range communications such as Bluetooth, near-field communication, location-based communication such as the use of the global positioning system (GPS) to determine a location, another like communication function, or any combination thereof. For example, the communications 110 may include cellular communication, Wi-Fi communication, Bluetooth communication, and GPS communication.

The particular configuration of serviceable system 100 is not a limitation of the present disclosure. Serviceable system 100 may include a variety of parts, modules, and systems requiring troubleshooting/repair by a service technician.

In an example illustrated in FIG. 1, a user 10 (e.g., a service technician) wears a garment on his/her hand. In one embodiment, the garment is a glove 120 having a thumb sheath 120a and four finger sheaths 120b-120e. In other embodiments, the garment may have other attributes operable to support the wearing of the garment on the user's hand. Regardless of the construction of the garment worn on the user's hand, one or more machine-readable codes are positioned on the garment. As will be explained further below, each machine-readable code is associated with a command where the command is machine command used to access and/or control information presented to the user on serviceable system 100. In the illustrated embodiment, only one glove 120 is used. In another embodiment, two of glove 120 may be provided for wearing by a user where one glove may be worn on the user's left hand and the other glove may be worn on the user's right hand.

In the example illustrated in FIG. 1, a set of machine-readable codes 130a-130e are positioned on the respective outboard ends or tip regions of the respective thumb and finger sheaths 120a-120e. The tip regions referred to herein could be at the front face or touch surface of the glove's sheaths or at the back face of the glove's sheaths in the areas thereof adjacent to the user's fingernail bed. In some embodiments, some of the machine-readable codes may be positioned on the front face or touch surface of the tip regions, while others of the machine-readable codes may be positioned on the back face of the tip regions. In an alternative embodiment, machine-readable codes may be positioned on both the front face and back face of one or more of the glove's tip regions.

Figure 3A:
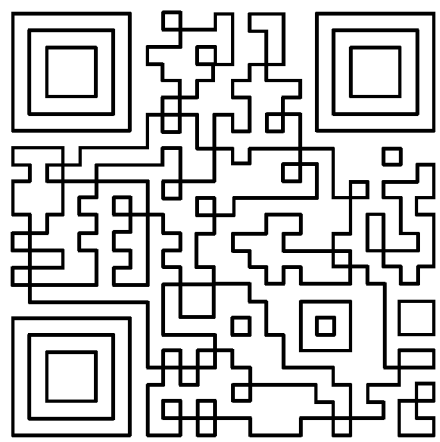
FIGS. 3A-3C illustrate embodiments of machine-readable codes in FIGS. 1 and 2 in accordance with various aspects as described herein.
Figure 3B:
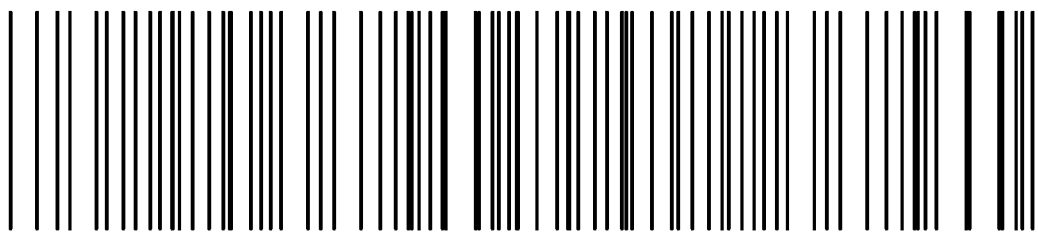
Figure 3C:

In some embodiments, each of machine-readable codes 130a-130e is unique such that each code is associated with a unique command interpretable by a processor to enable access to and/or control of some type of functional device or system as will be explained further below. The machine-readable codes may be configured for reading by a code reader 102 of serviceable system 100. In some embodiments, the machine-readable codes 130a-130e may be QR codes such as the QR code illustrated in FIG. 3A. In another embodiment, the machine-readable codes 130a-130e may be bar codes such as the bar code illustrated in FIG. 3B. In another embodiment, machine-readable codes 130a-130e may be simple icons such as the icon illustrated in FIG. 3C. In some embodiments, multiple types of codes may be used on a glove.

In some embodiments, the machine-readable codes 130a-130e are permanent in that they are permanently affixed or displayed on glove 120. For example, the codes could be printed on, attached to, or integrated with glove 120. In alternative embodiments, one or more of the machine-readable codes 130a-130e may be configured to be updated or replaced as needed. For example, the codes could be a permanent form of the code configured for removable attachment to glove 120.

Figure 2:
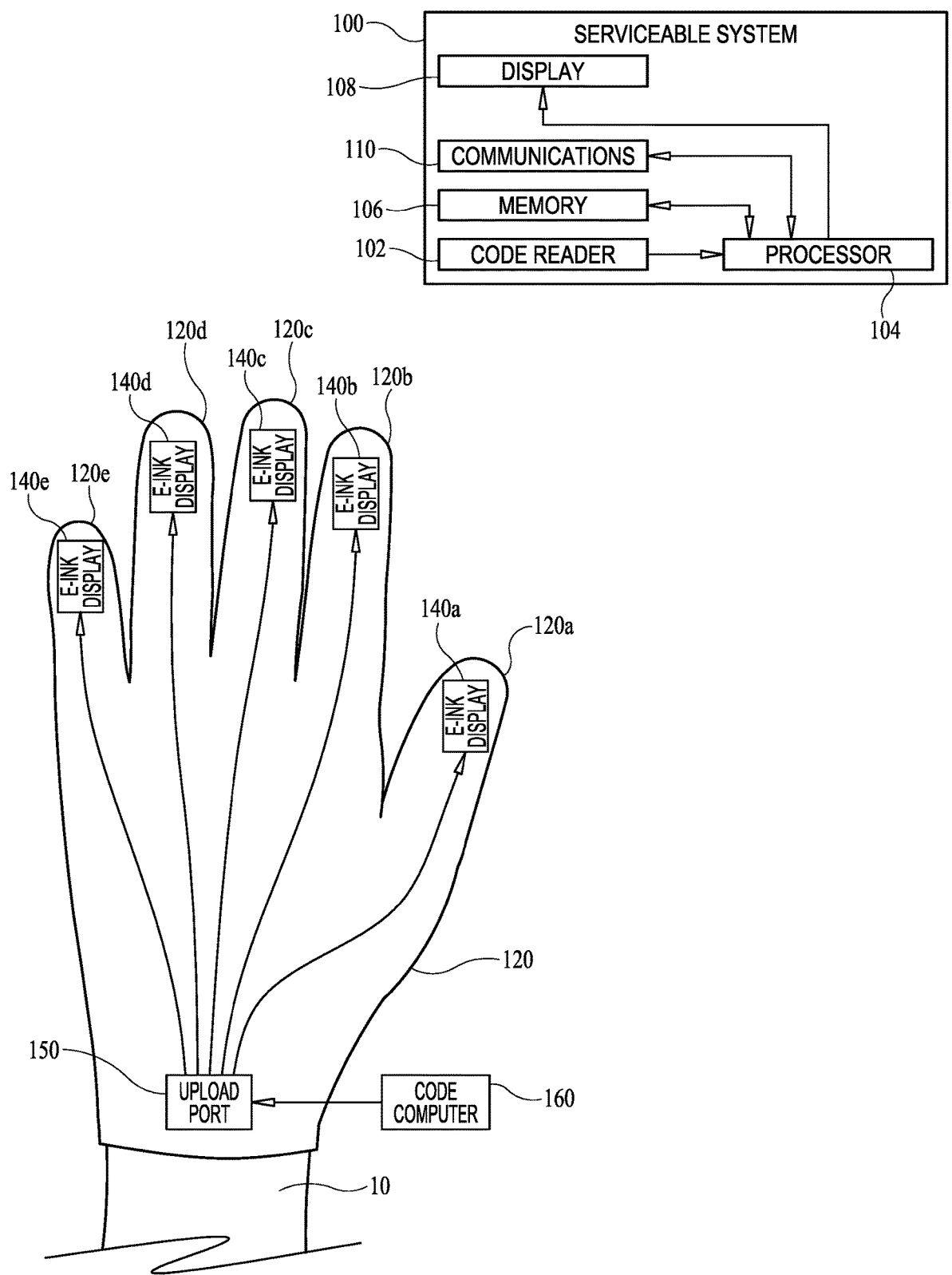
FIG. 2 illustrates one embodiment of a gesture-based wearable device having updatable coded commands in accordance with various aspects as described herein.

In another embodiment illustrated in FIG. 2, the glove 120 may include updatable displays operable to display the above-described machine-readable codes and operable to have the machine-readable code(s) changed or updated as needed. In the example illustrated in FIG. 2, each of thumb sheath 120a and finger sheaths 120b-120e has a corresponding electronic ink or e-ink display 140a-140e positioned on the tip regions thereof. Each of e-ink displays 140a-140e is operable and configurable to display one of the above-described machine-readable codes. Electronic ink displays are low-power consumption displays that are readily updated or changed. Accordingly, in this example of the glove 120, an upload port 150 such as a USB port may be provided on the glove 120 and coupled to each of e-ink displays 140a-140e. To create or update a machine-readable code on one or more of e-ink displays 140a-140e, a code computer 160 is connected to the upload port 150. The code computer 160 is any device that can provide the requisite signals to e-ink displays 140a-140e to create or update the code displayed thereon. In an alternative embodiment, some of the machine-readable codes may be of the permanent type as illustrated in FIG. 1, while others of the codes may be updatable as illustrated in FIG. 2.

Figure 4:
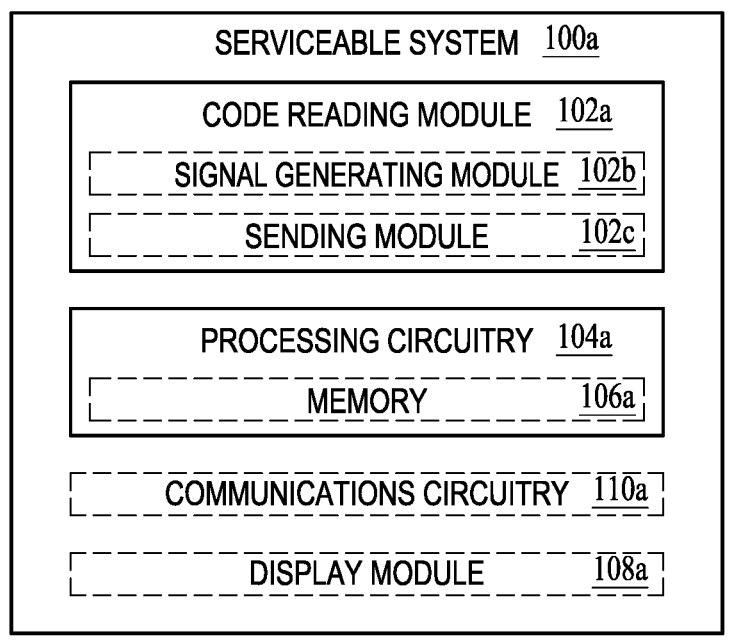
FIG. 4 illustrates one embodiment of a serviceable system in accordance with various aspects as described herein.

FIG. 4 illustrates an example of a serviceable system 100a in accordance with various aspects described herein. The above-described code reader 102 may include a code reading module 102a operably coupled to processing circuitry 104a. In one embodiment, code reading module 102a may include a signal generating module 102b that converts the machine-readable code on a glove sensed or read as described above to an electronic signal command representation thereof. In one embodiment, the signal generating module 102b is operably coupled to a sending module 102c that passes the generated signal command representation of the machine-readable code to the processing circuitry 104a. In one embodiment, the processing circuitry 104a may include or be operably coupled to a memory 106a that can store executing instructions for the processing circuitry 104a as well as data/information that may be accessed by the technician using the generated signal command representation of the particular machine-readable code read by the code reading module 102a. In another embodiment, the processing circuitry 104a recognizes the generated signal command representation of the particular machine-readable code as a "call" (e.g., a URL) to a local intranet or global internet. In such cases, the processing circuitry 104a is operably coupled to communications circuitry 110a to transmit the command in order to obtain access to data/information that is stored remotely with respect to serviceable system 100a. The processing circuitry 104a is operably coupled to a display module 108a so that locally-stored or remotely-stored data/information accessed using the command may be presented on the display (e.g., display 108) controlled by the display module 108a.

In another embodiment, the machine-readable code read by the code reading module 102a may be associated with a processor control command or a display control command. For example, one of the above-described machine readable codes may be associated with one of a "NEXT" or "BACK" command that allows a technician to scroll forward or back, respectively, through data/information being displayed by the display module 108a. In another example, one of the machine-read-able codes may be associated with one of a "PLAY", "REWIND", or "PAUSE" command that allows a technician to control the playback of a tutorial being displayed by the display module 108a.

Figure 5A:
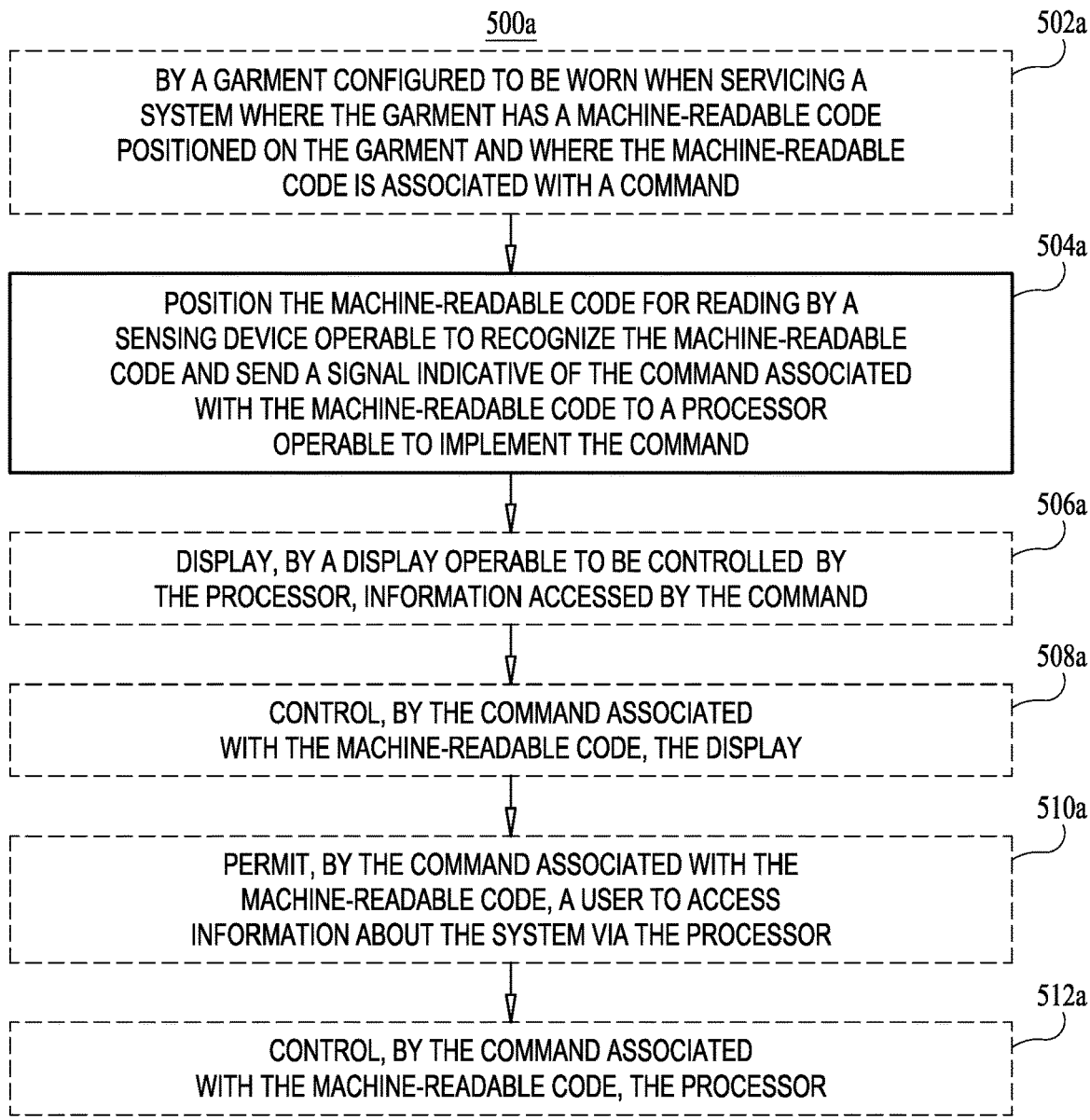
FIG. 5A illustrates one embodiment of a method by a garment configured to be worn on a user's hand when servicing a system in accordance with various aspects as described herein.

FIG. 5A illustrates one embodiment of a method 500a by a garment configured to be worn (e.g., on a technician's hand). In FIG. 5A, the method 500a may start, for instance, at block 502a where a user wears the garment (e.g., on their hand) when servicing a system, and where the garment has a machine-readable code associated with a command positioned thereon. At block 504a, the method 500a continues where the machine-readable code is positioned for reading by a sensing device operable to recognize the machine-readable code and send a signal indicative of the command associated with the machine-readable code to a processor for implementation of the command. At block 506a, the method 500a may include displaying, by a display operable to be controlled by the processor, information accessed by the command. At block 508a, the method 500a may include controlling, by the command associated with the machine-readable code, the display. At block 510a, the method 500a may include permitting, by the command associated with the machine-readable code, the user to access information about the system via the processor. At block 512a, the method

500a may include controlling, by the command associated with the machine-readable code, the processor.

Figure 5B:
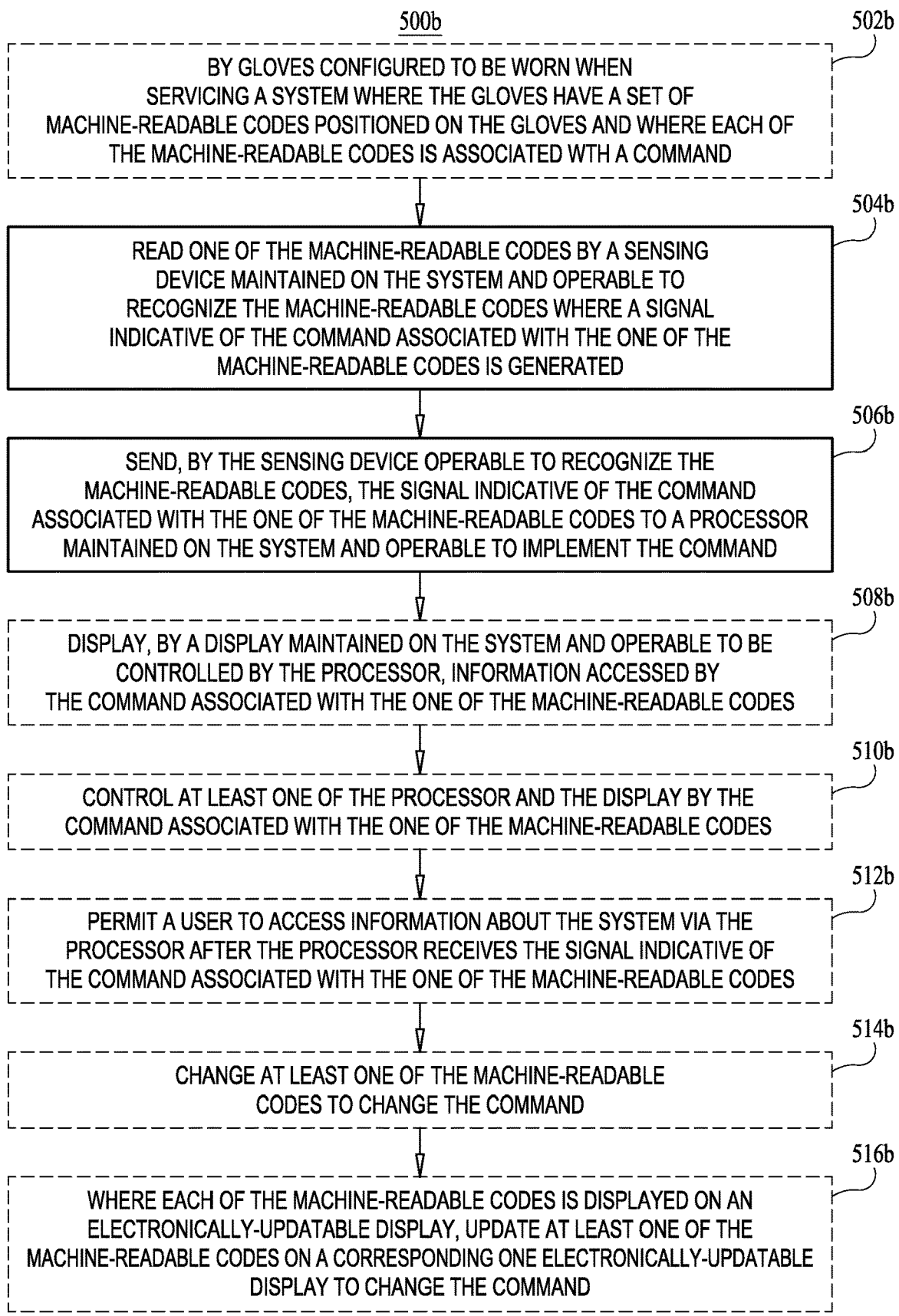
FIG. 5B illustrates one embodiment of a method by gloves configured to be worn on a user's hands when servicing a system in accordance with various aspects as described herein.

FIG. 5B illustrates one embodiment of a method 500b by gloves configured to be worn (e.g., on a technician's hands). In FIG. 5B, the method 500b may start, for instance, at block 502b where a user wears the gloves on their hands when servicing a system, and where the gloves have a set of machine-readable codes positioned thereon. Each of the codes is associated with a command. At block 504b, the method 500b continues where one of the machine-readable codes is read by a sensing device maintained on the system and operable to recognize the machine-readable code so that a signal indicative of the command is generated. The method 500b continues at block 506b where the sensing device reading the code and generating the signal indicative of the command sends the signal to a processor for implementation of the command. At block 508b, the method 500b may include displaying, by a display maintained on the system and operable to be controlled by the processor, information accessed by the command. At block 510b, the method 500b may include controlling, by the command associated with the machine-readable code, one of the processor and the display. At block 512b, the method 500b may include permitting the user to access information about the system via the processor after the processor receives the signal indicative of the command. At block 514b, the method 500b may include changing at least one of the machine-readable codes. At block 516b where each of the machine-readable codes is displayed on an electronically-updatable display, the method 500b may include updating at least one of the machine-readable codes on a corresponding one electronically-updatable display to change the command associated therewith.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

In one exemplary embodiment, a method is performed by a garment configured to be worn when servicing a system. The garment has a machine-readable code positioned on the garment. The machine-readable code is associated with a command. The method includes positioning the machine-readable code for reading by a sensing device operable to recognize the machine-readable code and send a signal indicative of the command associated with the machine-readable code to a processor operable to implement the command.

In another exemplary embodiment, the method further includes displaying, by a display operable to be controlled by the processor, information accessed by the command.

In another exemplary embodiment, the method further includes controlling, by the command associated with the machine-readable code, the display.

In another exemplary embodiment, the method further includes permitting, by the command associated with the machine-readable code, a user to access information about the system via the processor.

In another exemplary embodiment, the method further includes controlling, by the command associated with the machine-readable code, the processor.

In one exemplary embodiment, a device includes a garment adapted to be worn on a hand. At least one machine-readable code is positioned on the garment and is associated with a command.

In another exemplary embodiment, the device's garment comprises a glove having a thumb sheath and finger sheaths.

In another exemplary embodiment, the device's at least one machine-readable code comprises a unique code on each of the thumb sheath and finger sheaths.

In another exemplary embodiment, the device's at least one machine-readable code comprises a unique code on a tip of each of the thumb sheath and finger sheaths.

In another exemplary embodiment, the device's at least one machine-readable code is selected from the group consisting of permanent codes and updatable codes.

In another exemplary embodiment, the device's at least one machine-readable code is disposed at a tip region of at least one of the thumb sheath and the finger sheaths.

In another exemplary embodiment, the device includes at least one updatable display coupled to the glove. The at least one updatable display is operable to correspondingly present the at least one machine-readable code.

In another exemplary embodiment, the device includes an updatable display coupled to each of the thumb sheath and the finger sheaths with each updatable display being operable to present one machine-readable code.

In another exemplary embodiment, the device includes an updatable display coupled to a tip region of each of the thumb sheath and the finger sheaths with each updatable display being operable to present one machine-readable code.

In one exemplary embodiment, a method is performed by gloves configured to be worn when servicing a system. The gloves have a set of machine-readable codes positioned on the gloves. Each of the machine-readable codes is associated with a command. The method includes reading one of the machine-readable codes within the set of machine-readable codes by a sensing device maintained on the system and operable to recognize the machine-readable codes where a signal indicative of the command associated with the one of the machine-readable codes is generated. The method further includes sending, by the sensing device operable to recognize the machine-readable codes, the signal indicative of the command associated with the one of the machine-readable codes to a processor maintained on the system and operable to implement the command.

In another exemplary embodiment, the method further includes displaying, by a display maintained on the system and operable to be controlled by the processor, information accessed by the command associated with the one of the machine-readable codes.

In another exemplary embodiment, the method further includes controlling at least one of the processor and the display by the command associated with the one of the machine-readable codes.

In another exemplary embodiment, the method further includes permitting a user to access information about the system via the processor after the processor receives the signal indicative of the command associated with the one of the machine-readable codes.

In another exemplary embodiment, the method further includes changing at least one of the machine-readable codes to change the command.

In another exemplary embodiment where each of the machine-readable codes is displayed on an electronically-updatable display, the method further includes updating at least one of the machine-readable codes on a corresponding one electronically-updatable display to change the command.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:
   by a glove having thumb and finger sheaths and configured to be worn on a hand when servicing a system, wherein each sheath includes an updatable display operable to display one machine-readable code, with the machine-readable code being associated with a command;
   positioning the glove such that the machine-readable code displayed by the corresponding updatable display can be read by a sensing device operable to recognize the machine-readable code and can send a signal indicative of the command associated with the machine-readable code to a processor operable to implement the command.

2. The method of claim 1, further comprising:
   displaying, by a display operable to be controlled by the processor, information accessed by the command.

3. The method of claim 2, further comprising:
   controlling, by the command associated with the machine-readable code, the display.

4. The method of claim 1, further comprising:
permitting, by the command associated with the machine-readable code, a user to access information about the system via the processor.

5. The method of claim 1, further comprising:
controlling, by the command associated with the machine-readable code, the processor.

6. A device, comprising:
a glove having thumb and finger sheaths and adapted to be worn on a hand, with each sheath having an updatable display with each updatable display being operable to display one machine-readable code; and
at least one machine-readable code being displayed by one or more updatable displays positioned on the glove with the at least one machine-readable code being associated with a command.

7. The device of claim 6, wherein the at least one machine-readable code comprises a unique code on each sheath.

8. The device of claim 6, wherein the at least one machine-readable code comprises a unique code on a tip of each sheath.

9. The device of claim 6, wherein the at least one machine-readable code is selected from the group consisting of permanent codes and updatable codes.

10. The device of claim 6, wherein the at least one machine-readable code is disposed at a tip region of at least one sheath.

11. The device of claim 6, further comprising:
at least one updatable display coupled to the glove, the at least one updatable display operable to correspondingly present the at least one machine-readable code.

12. The device of claim 6, wherein the corresponding updatable display is coupled to a tip region of each sheath.

13. A method, comprising:
by gloves configured to be worn when servicing a system, wherein the gloves include thumb and finger sheaths with each sheath having an updatable display with each updatable display being operable to present one machine-readable code each machine-readable code being associated with a command,
reading one of the machine-readable codes of the set of machine-readable codes displayed by the corresponding updatable display by a sensing device maintained on the system and operable to recognize the machine-readable codes, wherein a signal indicative of the command associated with the one of the machine-readable codes is generated; and
sending, by the sensing device operable to recognize the machine-readable codes, the signal indicative of the command associated with the one of the machine-readable codes to a processor maintained on the system and operable to implement the command.

14. The method of claim 13, further comprising:
displaying, by a display maintained on the system and operable to be controlled by the processor, information accessed by the command associated with the one of the machine-readable codes.

15. The method of claim 14, further comprising:
controlling at least one of the processor and the display by the command associated with the one of the machine-readable codes.

16. The method of claim 13, further comprising:
permitting a user to access information about the system via the processor after the processor receives the signal indicative of the command associated with the one of the machine-readable codes.

17. The method of claim 13, further comprising:
changing at least one of the machine-readable codes wherein the command is changed.

18. The method of claim 13, further comprising:
updating at least one of the machine-readable codes on the corresponding updatable display, wherein the command is changed.

\* \* \* \* \*